(12) United States Patent
O'Sullivan et al.

(10) Patent No.: US 9,317,838 B2
(45) Date of Patent: Apr. 19, 2016

(54) SYSTEM AND METHOD FOR MANAGING CALENDARING EVENTS

(75) Inventors: Patrick Joseph O'Sullivan, Ballsbridge (IE); Liam Harpur, Skerries (IE); Fred Raguillat, Dunboyne (IE); Carol Sue Zimmet, Boxborough, MA (US); Daniel Terlizzi, Arezzo (IT)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 847 days.

(21) Appl. No.: 11/967,853

(22) Filed: Dec. 31, 2007

(65) Prior Publication Data

US 2009/0172097 A1     Jul. 2, 2009

(51) Int. Cl.
  *G06F 15/16* (2006.01)
  *G06Q 10/10* (2012.01)

(52) U.S. Cl.
  CPC .................................. *G06Q 10/109* (2013.01)

(58) Field of Classification Search
  CPC ... G06Q 10/109; G06Q 10/1093; G06F 15/16
  USPC ........... 709/204, 206; 705/8, 9; 715/752, 753; 708/112
  See application file for complete search history.

(56) References Cited

U.S. PATENT DOCUMENTS

| | | | |
|---|---|---|---|
| 4,745,599 A | 5/1988 | Raychaudhuri | |
| 4,774,707 A | 9/1988 | Raychaudhuri | |
| 5,166,545 A | 11/1992 | Harrington | |
| 5,241,542 A | 8/1993 | Natarajan et al. | |
| 5,280,518 A | 1/1994 | Danler et al. | |
| 5,583,450 A | 12/1996 | Trimberger et al. | |
| 5,677,997 A | 10/1997 | Talatik | |
| 5,818,815 A | 10/1998 | Carpentier et al. | |
| 5,842,173 A | 11/1998 | Strum et al. | |
| 5,864,851 A | 1/1999 | Breitbart et al. | |
| 5,873,094 A | 2/1999 | Talatik | |
| 5,915,115 A | 6/1999 | Talati | |
| 5,938,721 A | 8/1999 | Dussell et al. | |
| 5,999,931 A | 12/1999 | Breitbart et al. | |
| 5,999,942 A | 12/1999 | Talati | |
| 6,018,528 A | 1/2000 | Gitlin et al. | |
| 6,047,288 A * | 4/2000 | Kurosawa et al. | |
| 6,064,662 A | 5/2000 | Gitlin et al. | |
| 6,125,282 A | 9/2000 | Urabe | |
| 6,137,793 A | 10/2000 | Gorman et al. | |
| 6,343,299 B1 | 1/2002 | Huang et al. | |
| 6,618,723 B1 * | 9/2003 | Smith | |
| 6,781,920 B2 * | 8/2004 | Bates et al. | 368/10 |
| 6,889,333 B2 | 5/2005 | Lawrence et al. | |
| 6,931,419 B1 | 8/2005 | Lindquist | |
| 7,219,107 B2 | 5/2007 | Beringer | |
| 2004/0059587 A1 * | 3/2004 | Astle et al. | 705/1 |
| 2005/0273510 A1 * | 12/2005 | Schuh | 709/225 |
| 2006/0045029 A1 * | 3/2006 | Ethier et al. | 370/260 |
| 2007/0106725 A1 * | 5/2007 | Starr et al. | 709/204 |

\* cited by examiner

*Primary Examiner* — Cheikh Ndiaye
(74) *Attorney, Agent, or Firm* — Steven L. Nichols; Fabian VanCott

(57) ABSTRACT

An indication of a meeting being scheduled between a plurality of attendees is received. A first one of the attendees is designated an owner of the meeting. Ownership privileges for the meeting are associated with at least a second one of the meeting attendees. The ownership privileges associated with at least a second one of the meeting attendees are associated based upon, at least in part, an organizational structure.

20 Claims, 6 Drawing Sheets

SYSTEM AND METHOD FOR MANAGING CALENDARING EVENTS

BACKGROUND OF THE INVENTION

This disclosure relates to meeting management, and, more particularly, to the provision of meeting management privileges to meeting attendees based upon organizational structure.

Today, technology exists that allows a member of an organization to send meeting invites to other members of the organization so that meetings may be scheduled to e.g., discuss various topics of interest within the group of attendees. These meetings may be in person meetings or may be virtual meetings that occur through instant messaging systems, phone systems, video conference systems, electronic whiteboard systems, or any combination thereof.

Typically, an owner is designated for each meeting (often the individual that initially scheduled the meeting). The meeting owner may have specific management rights/obligations that the other attendees of the meeting do not have. Unfortunately, in the event that the assigned owner does not live up to the obligations, or is unable to perform the management functions, difficulties may arise. For example, if the designated owner is out sick the week immediately preceding the meeting and the meeting needs to be rescheduled, as only the designated meeting owner may reschedule the meeting, the meeting may not be rescheduled in the designated meeting owner's absence. Further, if a new member has joined the team and doesn't have the meeting in their calendar, the new team member will have to wait until the designated meeting owner returns before the new member can be added to the meeting attendance list.

BRIEF SUMMARY OF THE INVENTION

In a first implementation, a method includes receiving an indication of a meeting being scheduled between a plurality of attendees. A first one of the attendees is designated an owner of the meeting. Ownership privileges for the meeting are associated with at least a second one of the meeting attendees. The ownership privileges for the meeting are associated with the at least a second one of the meeting attendees based upon, at least in part, an organizational structure.

According to another implementation, a computer program product may reside on a computer readable medium having a plurality of instructions stored on it. When executed by a processor, the instructions cause the processor to perform operations including receiving an indication of a meeting being scheduled between a plurality of attendees. A first one of the attendees is designated an owner of the meeting. Ownership privileges for the meeting are associated with at least a second one of the meeting attendees. The ownership privileges for the meeting are associated with the at least a second one of the meeting attendees based upon, at least in part, an organizational structure.

One or more of the following feature may be included. The meeting may be an in-person meeting. The meeting may be a virtual meeting chosen from the group consisting of: an instant-message based meeting; a web-based meeting; a telephone conference; and a video conference.

The instructions for associating ownership privileges for the meeting with the at least a second one of the meeting attendees may include instructions for enabling the at least a second one of the meeting attendees to cancel the meeting. The instructions for associating ownership privileges for the meeting with the at least a second one of the meeting attendees may include instructions for enabling the at least a second one of the meeting attendees to reschedule the meeting. The instructions for associating ownership privileges for the meeting with the at least a second one of the meeting attendees may include instructions for enabling the at least a second one of the meeting attendees to add one or more additional meeting attendees. The instructions for associating ownership privileges for the meeting with the at least a second one of the meeting attendees may include instructions for enabling the at least a second one of the meeting attendees to remove one or more of the plurality of attendees.

The organizational structure may be defined within an organizational directory. The at least a second one of the meeting attendees may be of equal or higher hierarchal position as the designated owner within the organizational structure. The at least a second one of the meeting attendees may be within a management chain of the first one of the attendees.

DETAILED DESCRIPTION OF THE INVENTION

Figure 1:
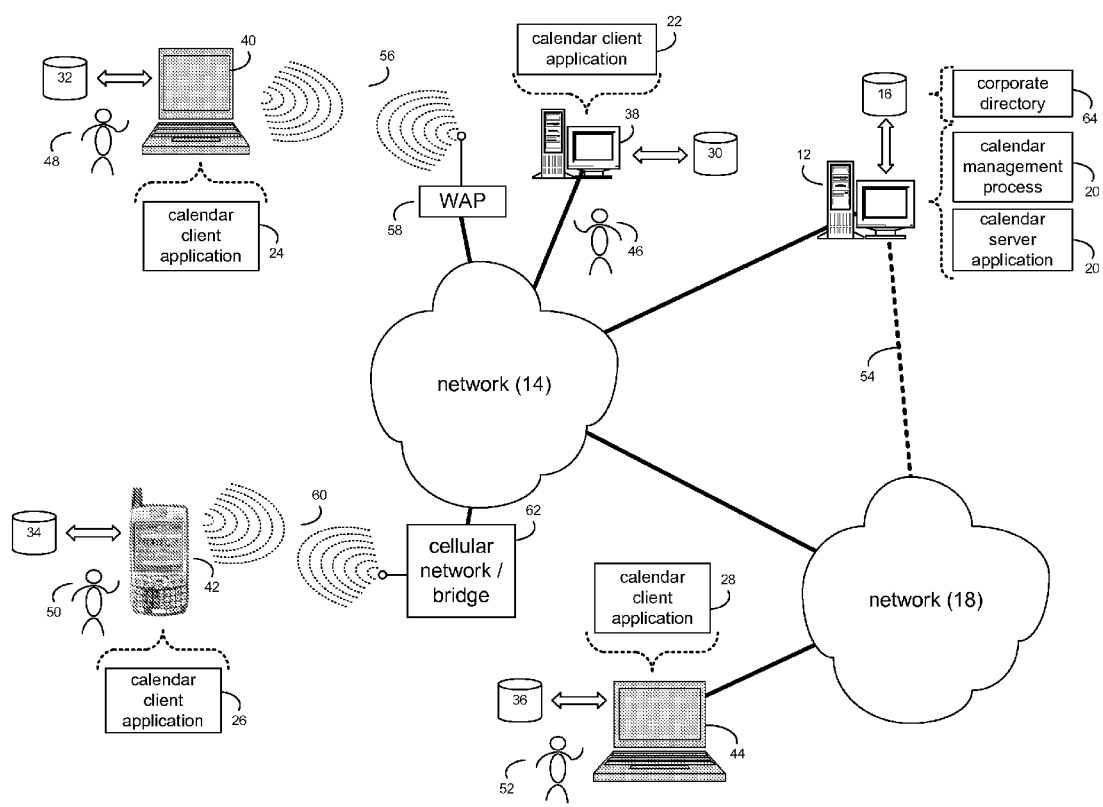
FIG. 1 is a diagrammatic view of a calendar management process, a calendar client application, and a calendar server application coupled to a distributed computing network.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown calendar management process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® XP Server; Novell® NetWare®; or Redhat® Linux®, for example (Microsoft and Windows are registered trademarks of Microsoft Corporation in the United States, other countries or both; Novell and NetWare are registered trademarks of Novell Corporation in the United States, other countries or both; Redhat is a registered trademark of RedHat Corporation in the United States, other countries or both; and Linux is a registered trademark of Linus Torvales in the United States, other countries or both), for example. Alternatively, the calendar management process may reside on and be executed, in whole or in part, by a client electronic device, such as a personal computer, notebook computer, personal digital assistant, or the like.

As will be discussed below in greater detail, calendar management process 10 may receive an indication of a meeting being scheduled between a plurality of attendees. A first one of the attendees may be designated as an owner of the meeting. Ownership privileges for the meeting may be associated with at least a second one of the meeting attendees. The ownership privileges for the meeting may be associated with the at least a second one of the meeting attendees based upon, at least in part, an organizational structure.

The instruction sets and subroutines of calendar management process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft IIS, Novell Webserver, or Apache Webserver, that allows for HTTP (i.e., HyperText Transfer Protocol) access to server computer 12 via network 14. Network 14 may be connected to one or more secondary networks (e.g., network 18), examples of which may include but are not limited to: a local area network; a wide area network; or an intranet, for example.

Server computer 12 may execute calendar server application 20, examples of which may include but are not limited to, e.g., IBM® Lotus® Domino® Server and Microsoft Exchange® Server. IBM, Lotus, Domino is a registered trademark of International Business Machines Corporation in the United States, other countries or both; Exchange is a registered trademark of Microsoft Corporation in the United States, other countries or both. Calendar server application 20 may be a collaboration software platform that may allow for user collaboration via calendar client applications, e.g., calendar client applications 22, 24, 26, 28, examples of which may include but are not limited to Lotus Notes and Microsoft Outlook. Calendar management process 10 may be a stand alone application that interfaces with calendar server application 20 or an applet/application that is executed within calendar server application 20.

The instruction sets and subroutines of calendar server application 20, which may be stored on storage device 16 coupled to server computer 12 may be executed by one or more processors (not shown) and one or more memory architectures (not shown) incorporated into server computer 12.

In addition/as an alternative to being a server-based application residing on server computer 12, the calendar management process may be a client-side application residing on a storage device (e.g., stored on storage devices 30, 32, 34, 36) coupled to one or more client electronic devices (e.g., client electronic devices 38, 40, 42, 44, respectively). As a client-side application, the calendar management process may, for example, be a stand alone application that may interface with a calendar client application, or may be an applet/application that is executed within a calendar client application. Accordingly, calendar management process may be a server-side process, a client-side process and/or may be a hybrid client-side/server-side process, which may be executed, in whole or in part, by a client electronic device, by a server computer, and/or jointly by a client electronic device and a server computer.

The instruction sets and subroutines of calendar client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example. Using calendar client applications 22, 24, 26, 28, users 46, 48, 50, 52 may access calendar server application 20 and may allow users to e.g., schedule in-person meetings, instant-message based meetings, web-based meetings, telephone conferences, and video conferences, and the like.

Users 46, 48, 50, 52 may access calendar server application 20 directly through the device on which the calendar client application (e.g., calendar client applications 22, 24, 26, 28) is executed, namely client electronic devices 38, 40, 42, 44, for example. Users 46, 48, 50, 52 may access calendar server application 20 directly through network 14 or through secondary network 18. Further, server computer 12 (i.e., the computer that executes calendar server application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, or a custom operating system.

For the following discussion, calendar client application 22 is going to be described for illustrative purposes. However, this is not intended to be a limitation of this disclosure, as other calendar client applications (e.g., calendar client applications 24, 26, 28) may be equally utilized.

Figure 2:
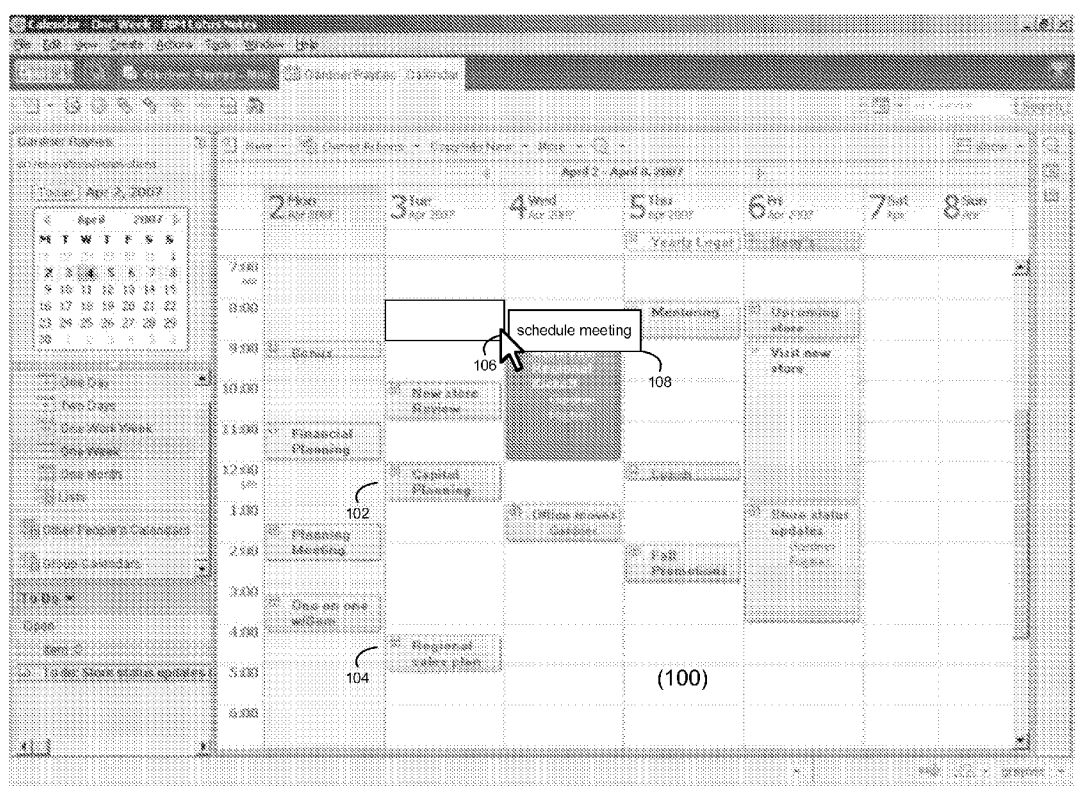
FIG. 2 is a diagrammatic view of a display screen rendered by the calendar client application and/or the calendar server application of FIG. 1.

Referring also to FIG. 2, calendar client application may allow user 46 to schedule meetings through a visual calendaring interface 100. Through visual calendaring interface 100, user 46 may schedule meetings with one or more users (e.g., user 48, user 50, user 52). Accordingly, meeting 102 (which is scheduled from 12:00-1:00 p.m. on Tuesday, 3 Apr. 2007) may be a meeting to which user 46, user 50, and user 52 are scheduled to attend. Further meeting 104 (which is scheduled from 4:15-5:15 p.m. on Tuesday, 3 Apr. 2007) may be a meeting to which user 46, user 48 and user 50 are scheduled to attend.

When scheduling meetings, user 46 may select the time period for which the meeting is to be scheduled. For example, user 46 may select, via on-screen pointer 106 (which may be controlled by a pointing device such as a mouse; not shown), the desired time period (e.g., 8:00-9:00 a.m. on Tuesday, 3 Apr. 2007). Once the desired time period is selected, user 46 may e.g., right-click the pointing device controlling on-screen pointer 106, resulting in calendar server application 20 and/or calendar client application 22 rendering pop-up window 108. While pop-up window 108 is shown to include only one option, namely "schedule meeting", this is for illustrative purposes only and is not intended to be a limitation of this disclosure, as the number of options included within pop-up window 108 may be increased or decreased depending upon the design criteria and user need.

Figure 3:
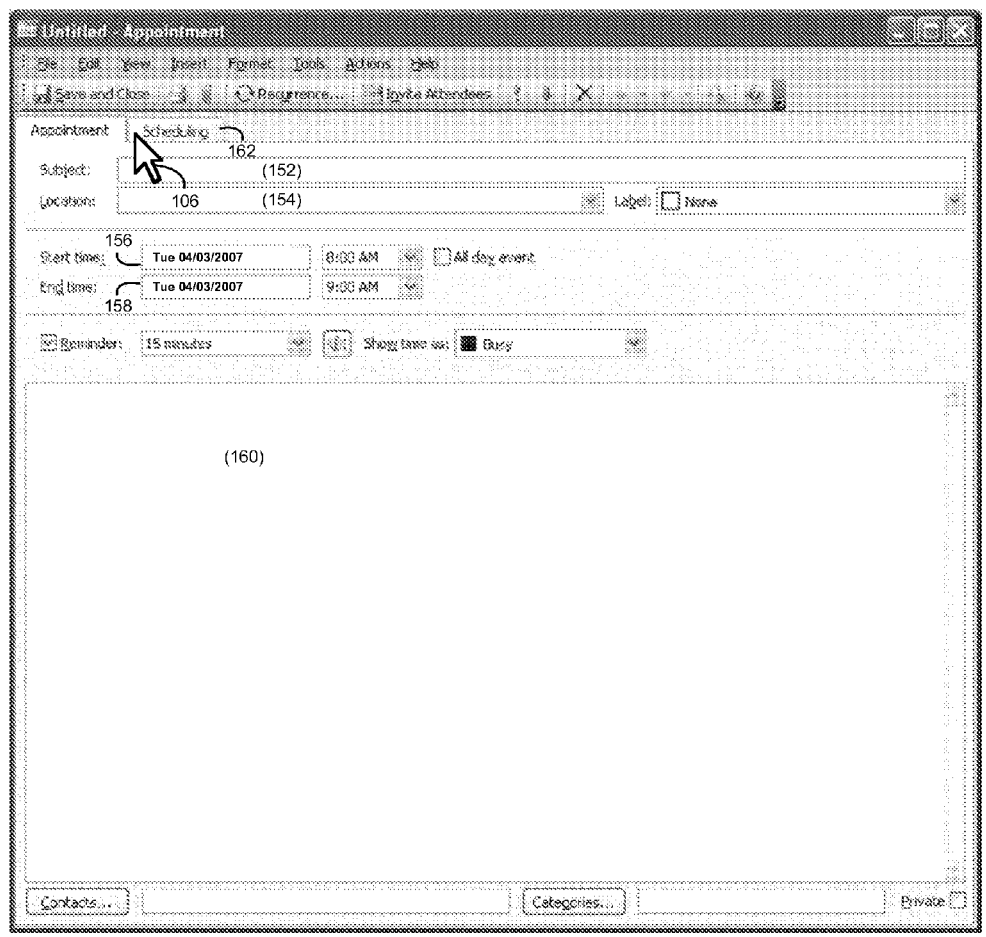
FIG. 3 is a diagrammatic view of a display screen rendered by the calendar client application and/or the calendar server application of FIG. 1.

Referring also to FIG. 3, upon selecting "schedule meeting" from pop-up window 108, calendar server application 20 and/or calendar client application 22 may render meeting window 150. Meeting window 150 may include a plurality of fields such as: subject field 152 (e.g., which may allow user 46 to define the subject of the meeting); location field 154 (e.g., which may allow user 46 to define the location of the meeting); start time field 156 (e.g., which may allow user 46 to define the starting time/date of the meeting); end time field 158 (e.g., which may allow user 46 to define the end time/date of the meeting); and comment field 160 (e.g., which may allow user 46 to define additional information relating to the meeting, such as dial in information; web address information; and video conference information; for example).

Figure 4:
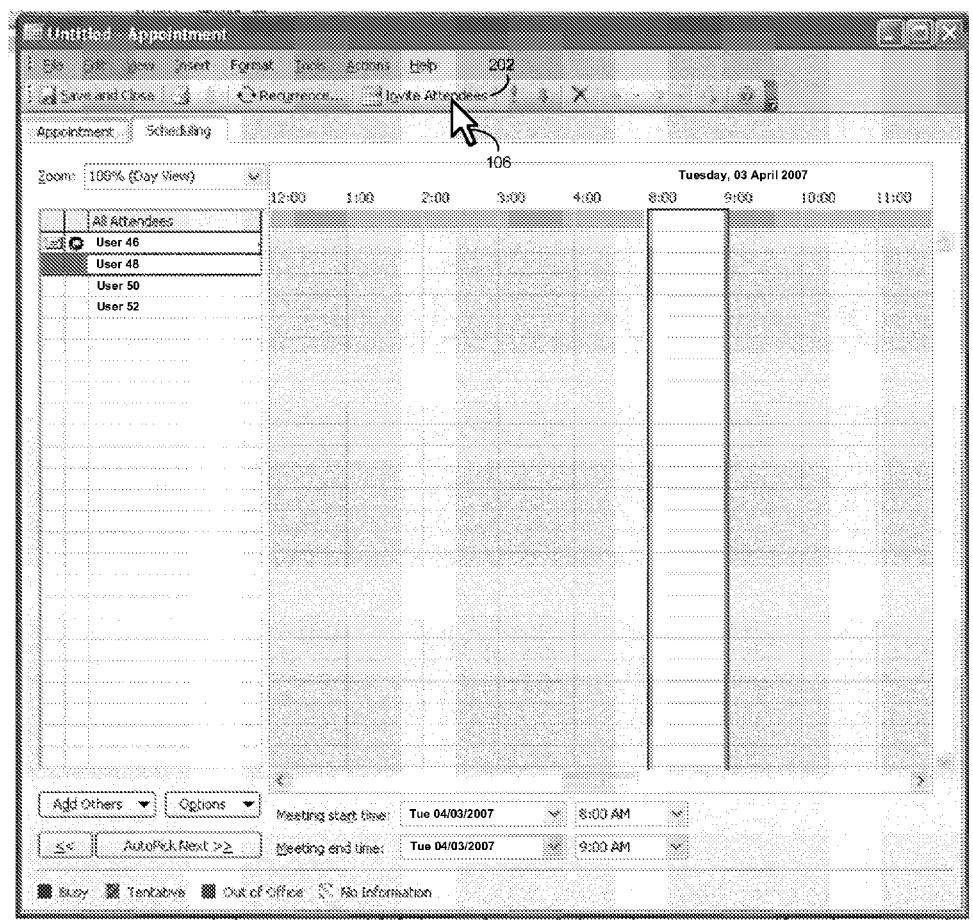
FIG. 4 is a diagrammatic view of a display screen rendered by the calendar client application and/or the calendar server application of FIG. 1.

User 46 may select "scheduling" tab 162 using on-screen pointer 106. Once selected, and referring also to FIG. 4, calendar server application 20 and/or calendar client application 22 may render scheduling window 200, which may allow user 46 to invite one or more attendees (e.g., user 48, user 50, user 52) to the meeting being scheduled. Accordingly, by selecting "invite attendees" button 202 using on-screen pointer 106, an attendee window (not shown) may be rendered by calendar server application 20 and/or calendar client application 22. The attendee window may allow user 46 to select one or more attendees for inviting to the meeting being scheduled. For illustrative purposes, scheduling window 200 is shown to have user 46, user 48, user 50, and user 52 invited to attend the meeting.

When scheduling a meeting, the person scheduling the meeting (e.g., user 46) may be automatically designated as the "owner" of the meeting. Alternatively, meeting window 150 and/or scheduling window 200 may include an owner field (not shown) that may allow the person scheduling the meeting to designate a moderator.

Figure 5:
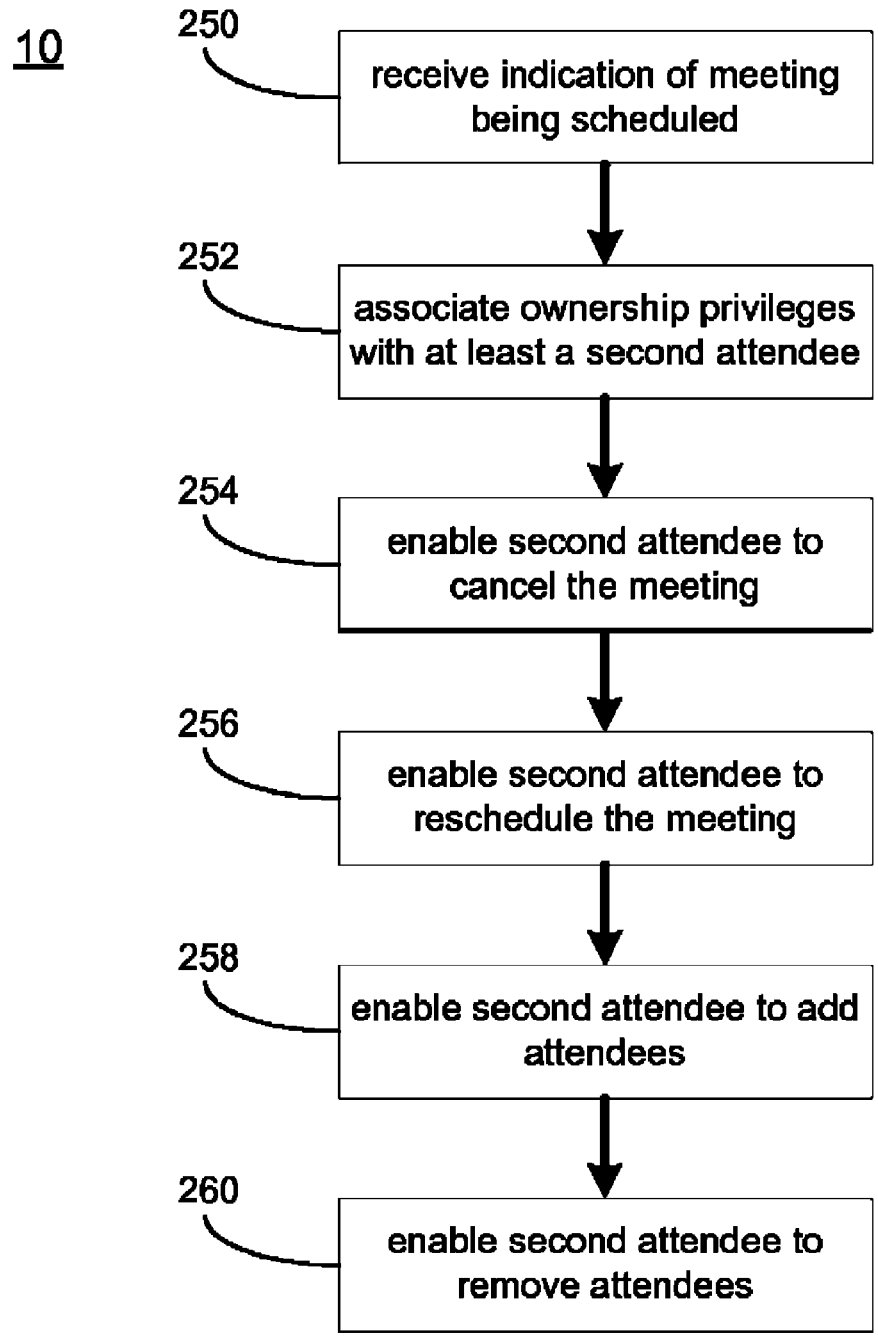
FIG. 5 is a flowchart of the calendar management process of FIG. 1.

Referring also to FIG. 5, calendar management process 10 may monitor calendar server application 20 and/or calendar client application 22 and determine when meetings are being scheduled. Upon receiving 250 an indication that a meeting has been scheduled between a plurality of attendees (in which at least on or the attendees was designated an owner of the meeting), calendar management process 10 may associate 252 ownership privileges for the meeting with at least a second one meeting attendee. Ownership privileges for the meeting may be associated 252 with at least a second one of the meeting attendees based upon, at least in part, an organizational structure.

For example, and as discussed above, assume that user 46 (as the user that scheduled the meeting) is automatically designated as the owner of the meeting. Assume for illustrative purposes that calendar management process 10 monitors the meeting scheduling activity that occurs within calendar server application 20 and/or calendar client application 22. As such, when user 46 schedules the meeting (to which user 48, user 50, and user 52 are invited to attend), calendar management process 10 may receive 250 an indication that the meeting is being scheduled from calendar server application 20 and/or calendar client application 22. Such indication may be automatically provided from calendar server application 20 and/or calendar client application 22 to calendar management process 10. Alternatively, calendar management process may be an applet or sub-process executed within calendar server application 20 (or within calendar client application 22) and may, therefore, proactively monitor the scheduling of meetings.

As the owner of the meeting, user 46 may have ownership privileges. Such ownership privileges may include, but are not limited to, the ability to invite attendees to the meeting (including subsequently inviting additional attendees to the meeting), removing (e.g., uninviting) attendees from the meeting, rescheduling the meeting (e.g., for a different time; to a different location; to a different format, such as from an in-person meeting to a telephone conference; etc.), and canceling the meeting. Ownership privileges may include various additional and/or alternative privileges and/or responsibilities.

Upon calendar management process 10 receiving 250 an indication that a meeting was scheduled for 8:00-9:00 a.m. on Tuesday, 3 Apr. 2007, for which user 46 is the designated owner, calendar management process 10 may associate ownership privileges with at least a second one of the meeting attendees (e.g., user 48, user 50, user 52) based upon, at least in part, an organizational structure. The organizational structure may be, for example, the organization structure of a company (i.e., Company X) for which the meeting attendees (i.e., user 46, user 48, user 50, and user 52) work. The organizational structure may be based upon, for example, seniority, pay grade, job title, or the like.

The organizational structure may be defined within an organizational directory, e.g., corporate directory 64 residing on storage device 16 of server computer 12. Corporate directory 64 may include a listing of all of the employees of Company X, as well as information including, but not limited to, employee attributes such as: what department each employee is assigned to, job description, job title, years of employment with Company X, pay grade, for example. Corporate directory 64 may be accessible by calendar management process 10 for evaluating the employee attributes of each of the meeting attendees (e.g., user 46, user 48, user 50, and user 52).

Figure 6:
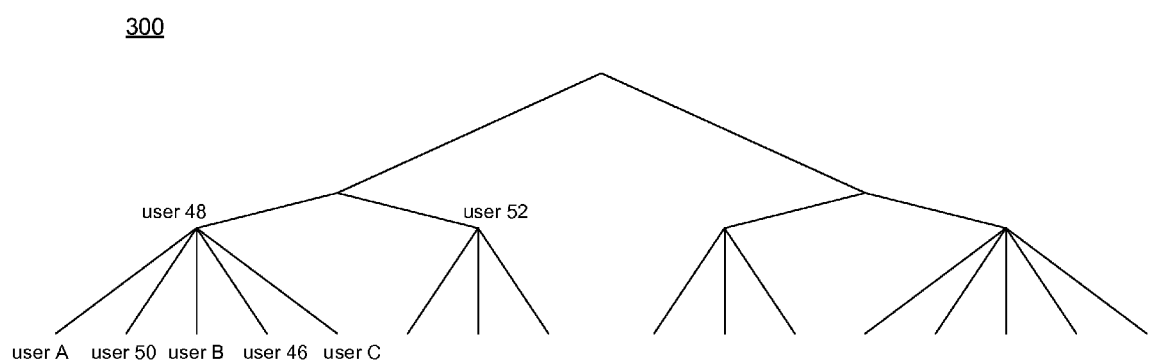
FIG. 6 diagrammatically depicts a hierarchal structure of an organization.

The at least a second one of the meeting attendees, with whom ownership privileges may be associated 252, may be of equal or higher hierarchal position as the designated owner within the organizational structure. For example, and referring also to FIG. 6, organizational structure 300 of Company X based upon, for example, pay grade or job title, may indicate a relative hierarchal position of each of the meeting attendees. For example, as shown, user 46 and user 50 may reside at the same hierarchal level. User 48 may reside at a higher hierarchal level as compared to user 46 and user 50. Additionally, user 48 may reside in the same department as user 46 and user 50. As such, it may be discerned that user 48 is user 46 and user 50's manager. User 52 may reside at the same hierarchal level as user 48, but in a different department.

Continuing with the above-stated example, based upon organizational structure 300 defined in corporate directory ownership privileges may be associated 252 with user 50, who has an equal hierarchal position as user 46, the designated owner of the meeting. Further, as each of user 48 and user 52 reside at a higher hierarchal position than user 46, calendar management process may associate 252 ownership privileges with each of user 48 and 52. While not shown, a meeting attendee having a lower hierarchal position than user 46 may not receive ownership privileges.

In the interest of controlling the number of users having ownership privileges, calendar management process 10 may associate 252 ownership privileges with only a single second meeting attendee. Various decision routines may be applied for controlling the other meeting attendees with whom ownership privileges may be associated. For example, the at least a second one of the meeting attendees may be an attendee within a management chain of the designated owner. Referring to organizational structure 300 defined within corporate directory 64, user 48 and user 50 may reside within the same management chain as user 46, by virtue of being within the same department as user 46. However, user 52, while having a higher hierarchal position than user 46, may reside in a different department, and may, therefore, be outside of the management chain of the designated owner (i.e., user 46). In the foregoing example, calendar management process 10 may associate ownership privileges with user 48 and user 50, but not with user 52. Various additional or alternative limitations may be placed on the association of ownership privileges according to design criteria and user need.

Similarly, in the interest of controlling the number of users having ownership privileges, calendar management process 10 may only selectively associate 252 ownership privileges with meeting attendees having an equal hierarchal position as the meeting owner. Continuing with the above-stated example in which user 46 is the meeting owner, calendar management process 10 may not associate ownership privileges with users 50, A, B, C (e.g., having the same hierarchal position as user 46). Alternatively, calendar management process 10 may require user 46 to specify (e.g., via an option selection menu; not shown) that one or more of users 50, A, B, C may receive ownership privileges. Various additional/alternative limitations may be placed on the association 252 of ownership privileges with meeting attendees having an equal hierarchal position as the meeting owner.

As the department manager, user 48 may decide that the meeting should not go forward, e.g., because one or more required attendees will not be available during the scheduled time of the meeting. Having determined that the meeting can no longer be carried out as scheduled, user 48 could contact user 46, the designated owner of the meeting, and request that the meeting be cancelled. However, contacting user 46 to request the cancellation of the meeting may entail the additional administrative overhead of contacting user 46, and then having user 46 cancel the meeting. The problem may be exacerbated if, for example, user 46 is traveling, sick, or otherwise not immediately available. Not only would it be necessary to chase user 46 down, but there may also be the risk that intervening tasks may cause user 48 to forget to contact user 46 about canceling the meeting.

Associating 252 ownership privileges for the meeting with the at least a second one of the meeting attendees may include associating full ownership privileges with the at least a second one of the meeting attendees, or associating only a subset of ownership privileges with the at least a second one of the meeting attendees. For example, as discussed above, ownership privileges may include, but are not limited to, the ability to invite attendees to the meeting (including subsequently inviting additional attendees to the meeting), removing (e.g., uninviting) attendees from the meeting, rescheduling the meeting (e.g., for a different time; to a different location; to a different format, such as from an in-person meeting to a telephone conference; etc.), and canceling the meeting, as well as various additional and/or alternative privileges with respect to the meeting. Associating 252 ownership privileges may in include associating all ownership privileges (e.g., a full delegation) or associating only a portion of the privileges (e.g., a partial or restricted delegation). The number and/or extent of ownership privileges associated with the at least a second meeting attendee may be, for example, determined on a systemic level and/or may be determined by the meeting owner (e.g., user 46) at the time the meeting is scheduled.

Associating 252 ownership privileges for the meeting with the at least a second one of the meeting attendees may include enabling 254 the at least a second one of the meeting attendees to cancel the meeting. Assume for illustrative purposes that calendar management process 10 associates 252 ownership privileges with user 48. As such, calendar management process 10 may enable user 48 to cancel the meeting. Rather than requesting that user 46, as the designated owner of the meeting, cancel the meeting, calendar management process 10 may enable 254 user 48 to cancel (e.g., via a calendar visual interface; not shown) the meeting himself.

Associating 252 ownership privileges for the meeting with the at least a second one of the meeting attendees may include enabling 256 the at least a second one of the meeting attendees to reschedule the meeting. Continuing with the above-stated example, rather than wishing to outright cancel the meeting, user 48 may decide that, in view of the absent essential attendees, the meeting should be postponed until everyone is able to attend. As discussed above, coordinating the postponement of the meeting with user 46, as the designated owner of the meeting, may introduce additional problems or complications. Having associated 252 ownership privileges with user 48, calendar management process 10 may enable 256 user 48 to reschedule (e.g., via a calendar visual interface, meeting window, or the like similar to those described above; not shown) the meeting for a later date, e.g., later in the week when all of the necessary attendees are expected to be available.

Furthermore, associating 252 ownership privileges for the meeting with the at least a second one of the meeting attendees may include enabling 258 the at least a second one of the meeting attendees to add one or more additional meeting attendees. Continuing further with the above-stated example, when user 48 accesses, e.g., a calendar visual interface, to reschedule the meeting, user 48 may realize that only a portion of the department has been invited to the meeting. Deeming the attendance of the entire department to be necessary for optimum productivity of the meeting, user 48 may wish to invite one or more additional users from the department (e.g., user A, user B, user C). Again, rather than accruing the additional administrative overhead of coordinating the addition of user A, user B, and user C to the meeting, calendar management process 10 may enable 258 user 48 to invite (e.g., via a calendar visual interface, meeting window, or the like; not shown) user A, user B, and user C to the meeting.

Associating 252 ownership privileges for the meeting with the at least a second one of the meeting attendees may include enabling 260 the at least a second one of the meeting attendees to remove one or more of the plurality of attendees. Still continuing with the above-described example, in addition to realizing that members of the department were not invited to the meeting, user 48 may realize that user 52, the director of the finance department of Company X, was invited to the meeting even though the topic of the meeting relates to development progress of a new software product. Having realized that user 52 is not necessary for the meeting, calendar management process 10 may enable 260 user 48 to remove (e.g., via a calendar visual interface, meeting window, or the like; not shown) user 52 from the meeting.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method comprising:
   receiving, by a calendar management computing system located on a server communicating via a network with a number of client devices executing a calendar application, an indication of a meeting being scheduled in the calendar application between a plurality of attendees, wherein a first one of the meeting attendees is designated an owner of the meeting;
   determining, by the calendar management computing system, whether at least a second one of the meeting attendees is a manager in a management chain of the owner of the meeting based upon hierarchical information about the meeting attendees in an organizational structure defined within an organizational directory; and
   if the second one of the meeting attendees is the manager of the owner of the meeting based on the management chain of the owner, associating, by the calendar management computing system, ownership privileges for the meeting with the second one of the meeting attendees;
   if the second one of the meeting attendees is not a manager of the owner of the meeting, determining whether the second one of the meeting attendees is outside of a department of the owner based on the organizational structure, and ensuring that the second one of the meeting attendees outside of a department of the owner based on the organizational structure may not have ownership authority over the meeting,
   in which the manager is an attendee in a management chain of the owner, and
   in which attendees outside of the owner's management chain are not assigned as the manager.

2. The method of claim 1, wherein the meeting is an in-person meeting.

3. The method of claim 1, wherein the meeting is a virtual meeting chosen from the group consisting of:
   an instant-message based meeting;
   a web-based meeting;
   a telephone conference; and
   a video conference.

4. The method of claim 1, wherein associating ownership privileges for the meeting with the at least a second one of the meeting attendees includes enabling the at least a second one of the meeting attendees to cancel the meeting.

5. The method of claim 1, wherein associating ownership privileges for the meeting with the at least a second one of the meeting attendees includes enabling the at least a second one of the meeting attendees to reschedule the meeting.

6. The method of claim 1, wherein associating ownership privileges for the meeting with the at least a second one of the meeting attendees includes enabling the at least a second one of the meeting attendees to add one or more additional meeting attendees.

7. The method of claim 1, wherein associating ownership privileges for the meeting with the at least a second one of the meeting attendees includes enabling the at least a second one of the meeting attendees to remove one or more of the plurality of attendees.

8. The method of claim 1, wherein the organizational structure is defined within an organizational directory.

9. The method of claim 1 wherein the information about the attendees in the organizational structure includes one or more of:
   a pay grade of the second one of the meeting attendees;
   a job title of the second one of the meeting attendees;
   a hierarchical level of the second one of the meeting attendees; and
   a department of the second one of the attendees.

10. The method of claim 1, in which associating ownership privileges for the meeting with the at least a second one of the meeting attendees comprises associating a portion of the ownership privileges for the meeting with the at least a second one of the meeting attendees.

11. The method of claim 1, further comprising controlling the number of users having ownership privileges by associating ownership privileges with a single second meeting attendee.

12. A computer program product stored on a computer readable storage device, having a plurality of instructions, which, when executed by a processor, cause the processor to perform operations comprising:
   receiving an indication of a meeting being scheduled between a plurality of attendees, wherein a first one of the meeting attendees is designated an owner of the meeting;
   determining, by a calendar management computing system located on a server communicating via a network with a number of client devices executing a calendar application, whether at least a second one of the meeting attendees is a manager in a management chain of the owner of the meeting based upon hierarchical information about the meeting attendees in an organizational structure defined within an organizational directory; and
   if the second one of the meeting attendees is a manager of the owner of the meeting based on the management chain of the owner, associating ownership privileges for the meeting with the second one of the meeting attendees;
   if the second one of the meeting attendees is not a manager of the owner of the meeting, determining whether the second one of the meeting attendees is outside of a department of the owner based on the organizational structure, and ensuring that the second one of the meeting attendees outside of a department of the owner based on the organizational structure may not have ownership authority over the meeting,
   in which the manager is an attendee in a management chain of the owner, and in which attendees outside of the owner's management chain are not assigned as the manager.

13. The computer program product of claim 12, wherein the meeting is an in-person meeting.

14. The computer program product of claim 12, wherein the meeting is a virtual meeting chosen from the group consisting of:
   an instant-message based meeting;
   a web-based meeting;
   a telephone conference; and
   a video conference.

15. The computer program product of claim 12, wherein associating ownership privileges for the meeting with the at least a second one of the meeting attendees includes enabling the at least a second one of the meeting attendees to cancel the meeting.

16. The computer program product of claim 12, wherein associating ownership privileges for the meeting with the at least a second one of the meeting attendees includes enabling the at least a second one of the meeting attendees to reschedule the meeting.

17. The computer program product of claim 12, wherein associating ownership privileges for the meeting with the at least a second one of the meeting attendees includes enabling the at least a second one of the meeting attendees to add one or more additional meeting attendees.

18. The computer program product of claim 12, wherein associating ownership privileges for the meeting with the at least a second one of the meeting attendees includes enabling the at least a second one of the meeting attendees to remove one or more of the plurality of attendees.

19. The computer program product of claim 12, wherein the organizational structure is defined within an organizational directory.

20. The computer program product of claim 12 wherein the information about the attendees in the organizational structure includes one or more of:
   a pay grade of the second one of the meeting attendees;
   a job title of the second one of the meeting attendees;
   a hierarchical position of the second one of the meeting attendees; and
   a department of the second one of the attendees.

\* \* \* \* \*